(12) United States Patent
Chan (10) Patent No.: US 10,644,605 B1
(45) Date of Patent: May 5, 2020

(54) POWER SUPPLY DEVICE

(71) Applicant: Acer Incorporated, New Taipei (TW)

(72) Inventor: Tzu-Tseng Chan, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/520,539

(22) Filed: Jul. 24, 2019

(30) Foreign Application Priority Data

Jun. 6, 2019 (TW) .............................. 108119630 A (51) Int. Cl.
*H02M 3/335* (2006.01)
*H02M 1/08* (2006.01)

(52) U.S. Cl.
CPC ......... *H02M 3/33569* (2013.01); *H02M 1/08* (2013.01)

(58) Field of Classification Search
CPC ......... H02M 3/33507; H02M 3/33569; H02M 1/08; H02M 1/088; H02M 1/092; H02M 1/096; H02M 2007/4815; Y02B 70/1433; Y02B 70/1441
USPC ............................................ 363/21.01–21.18
See application file for complete search history.

(56) References Cited

U.S. PATENT DOCUMENTS

| | | | |
|---|---|---|---|
| 3,474,400 A * | 10/1969 | Auer, Jr. ................. | G01S 7/527 367/93 |
| 9,184,661 B2 * | 11/2015 | Melanson ............. | H02M 3/335 |
| 9,787,195 B1 * | 10/2017 | Xiong ............... | H02M 3/33507 |
| 2015/0109830 A1 * | 4/2015 | Xu ..................... | H02M 3/33569 363/21.03 |
| 2019/0020277 A1 * | 1/2019 | Liu .................... | H02M 3/33507 |
| 2019/0074759 A1 * | 3/2019 | Yen ........................ | H02M 1/08 |
| 2019/0089250 A1 * | 3/2019 | Liu ..................... | H02M 3/1582 |
| 2019/0271998 A1 * | 9/2019 | Sisson ..................... | G05F 1/468 |

* cited by examiner

*Primary Examiner* — Yemane Mehari
(74) *Attorney, Agent, or Firm* — McClure, Qualey & Rodack, LLP (57) ABSTRACT

A power supply device includes an input stage circuit, a controller, a multi-order resonant circuit, a transformer, and an output stage circuit. The input stage circuit generates a switching voltage according to an input voltage. The controller generates a first control voltage and a second control voltage according to the switching voltage. The multi-order resonant circuit provides a reference voltage at a first node. The multi-order resonant circuit includes a first current path and a second current path. The first node is respectively coupled through the first current path and the second current path to a ground voltage. The first current path and the second current path are selectively closed or open according to the first control voltage and the second control voltage. The output stage circuit generates an output voltage according to the transformation voltage of the transformer.

16 Claims, 6 Drawing Sheets

POWER SUPPLY DEVICE

CROSS REFERENCE TO RELATED APPLICATIONS

This Application claims priority of Taiwan Patent Application No. 108119630 filed on Jun. 6, 2019, the entirety of which is incorporated by reference herein.

BACKGROUND OF THE INVENTION

Field of the Invention

The disclosure generally relates to a power supply device, and more specifically, to a power supply device for increasing output stability.

Description of the Related Art

Figure 1:
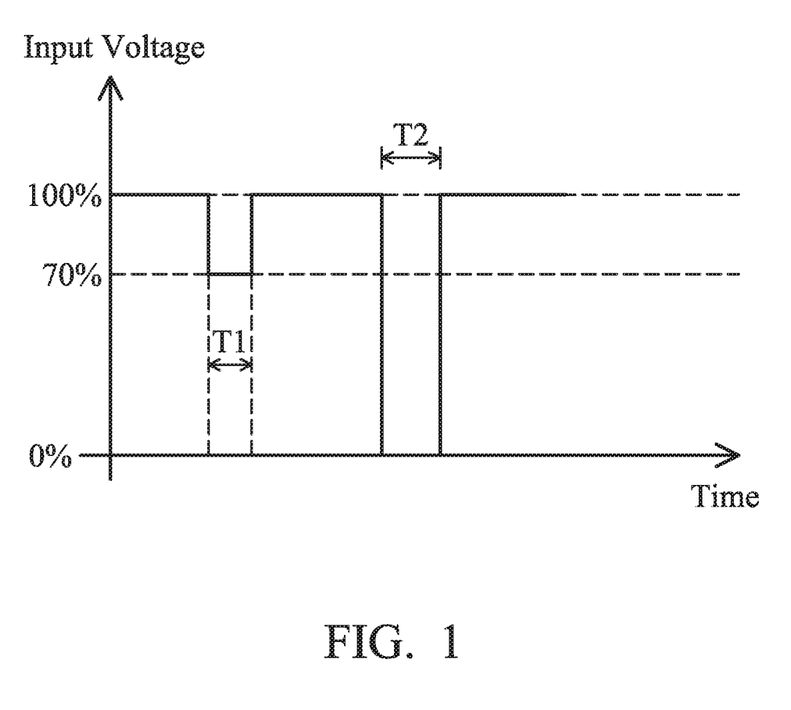
FIG. 1 is a diagram of the relationship between an input voltage of an external power source and time.

When power is supplied to an electronic device by an external power source that is not stable enough, an unwanted "voltage dip" or "short interruption" may occur. FIG. 1 is a diagram of the relationship between the input voltage of an external power source and time. As shown in FIG. 1, during the first time period T1, the input voltage of the external power source drops by about 30%: this is considered as the aforementioned voltage dip. During the second time period T2, the input voltage of the external power source drops by about 100%, and this is considered as the aforementioned short interruption.

A conventional power supply device usually provides a very short holding-up time when a voltage dip or a short interruption happens in the external power source. Thus, the conventional power supply device cannot meet the requirements set by the IEC (International Electro Technical Commission). Accordingly, there is a need to propose a novel solution for overcoming the problems of the prior art.

BRIEF SUMMARY OF THE INVENTION

In a preferred embodiment, the invention is directed to a power supply device which includes an input stage circuit, a controller, a multi-order resonant circuit, a transformer, and an output stage circuit. The input stage circuit generates a switching voltage according to an input voltage. The controller detects the switching voltage and generates a first control voltage and a second control voltage according to the switching voltage. The multi-order resonant circuit provides a reference voltage at a first node. The multi-order resonant circuit includes a first current path and a second current path. The first node is respectively coupled through the first current path and the second current path to a ground voltage. The first current path is selectively closed or open according to the first control voltage. The second current path is selectively closed or open according to the second control voltage. The transformer generates a transformation voltage according to the voltage difference between the switching voltage and the reference voltage. The output stage circuit generates an output voltage according to the transformation voltage.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are described in detail as follows.

Figure 2:
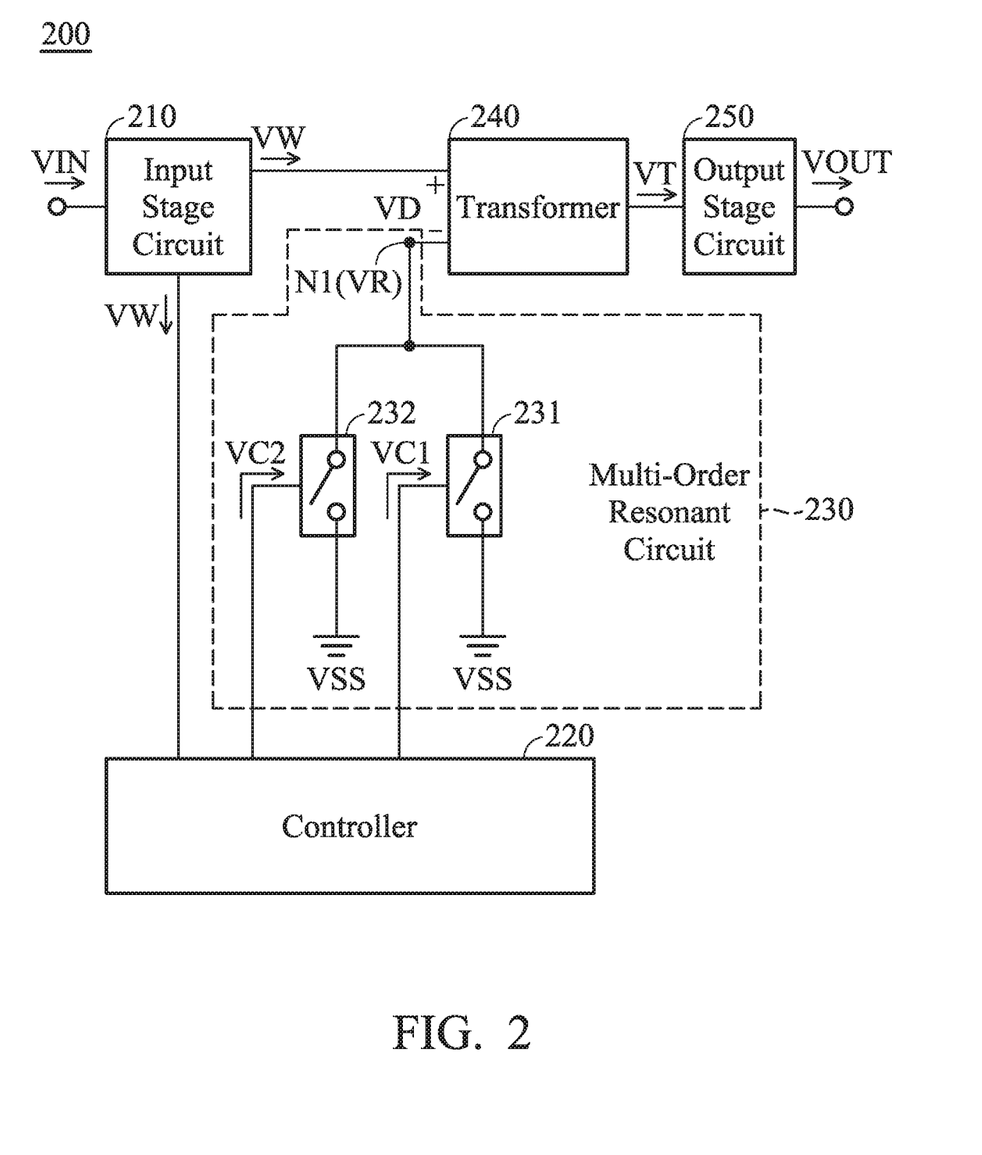
FIG. 2 is a diagram of a power supply device according to an embodiment of the invention.

FIG. 2 is a diagram of a power supply device 200 according to an embodiment of the invention. For example, the power supply device 200 may be applied to a desktop computer, a notebook computer, or an all-in-one computer. As shown in FIG. 2, the power supply device 200 includes an input stage circuit 210, a controller 220, a multi-order resonant circuit 230, a transformer 240, and an output stage circuit 250. The input stage circuit 210 generates a switching voltage VW according to an input voltage VIN. The input voltage VIN may be from an external power source. The input voltage VIN may be an AC (Alternating Current) voltage with any frequency and any magnitude. For example, the frequency of the input voltage VIN may be about 50 Hz, and the RMS (Root-Mean-Square) value of the input voltage VIN may be about 100V, but they are not limited thereto. The controller 220 may be an IC (Integrated Circuit) chip. The controller 220 detects the switching voltage VW, and then generates a first control voltage VC1 and a second control voltage VC2 according to the switching voltage VW. The multi-order resonant circuit 230 provides a reference voltage VR at a first node N1. Specifically, the multi-order resonant circuit 230 includes a first current path 231 and a second current path 232. The first node N1 is respectively coupled through the first current path 231 and the second current path 232 to a ground voltage VSS (e.g., 0V). The first current path 231 is selectively closed or open according to the first control voltage VC1. The second current path 232 is selectively closed or open according to the second control voltage VC2. The transformer 240 generates a transformation voltage VT according to a voltage difference VD between the switching voltage VW and the reference voltage VR. The output stage circuit 250 generates an output voltage VOUT according to the transformation voltage VT. The output voltage VOUT may be a DC (Direct Current) voltage with any voltage level. For example, the voltage level of the output voltage VOUT may be constant 19V, but it is not limited thereto. According to practical measurements, such a circuit design can increase the output stability of the power supply device 200. It should be noted that the power supply device 200 may further include other components, such as a voltage regulator and/or a negative feedback circuit, although they are not displayed in FIG. 2.

The following embodiments will introduce the detailed structure and operation of the power supply device 200. It should be understood these figures and descriptions are merely exemplary, rather than limitations of the invention.

Figure 3:
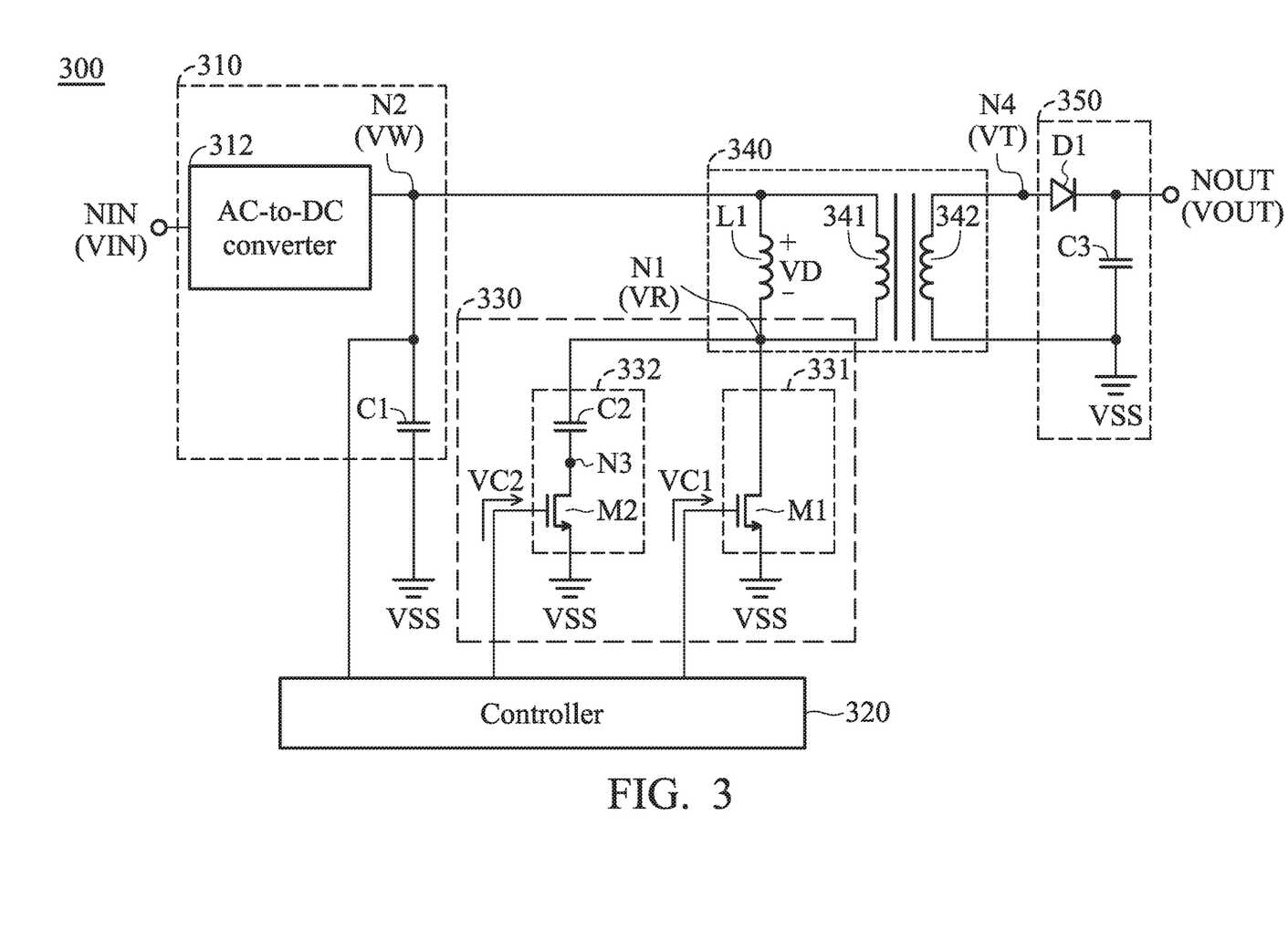
FIG. 3 is a diagram of a power supply device according to an embodiment of the invention.

FIG. 3 is a diagram of a power supply device 300 according to an embodiment of the invention. In the embodiment of FIG. 3, the power supply device 300 with an input node NIN and an output node NOUT includes an input stage circuit 310, a controller 320, a multi-order resonant circuit 330, a transformer 340, and an output stage circuit 350. The input node NIN of the power supply device 300 is arranged for receiving an input voltage VIN from an external power source. The output node NOUT of the power supply device 300 is arranged for outputting an output voltage VOUT to an electronic device (e.g., an all-in-one computer). The multi-order resonant circuit 330 includes a first current path 331 and a second current path 332. The multi-order resonant circuit 330 provides a reference voltage VR at a first node N1. The first node N1 is respectively coupled through the first current path 331 and the second current path 332 to a ground voltage VSS.

The input stage circuit 310 includes an AC-to-DC converter 312 and a first capacitor C1. The AC-to-DC converter 312 converts the input voltage VIN at the input node NIN into a switching voltage VW at a second node N2. The first capacitor C1 has a first terminal coupled to the second node N2, and a second terminal coupled to the ground voltage VSS. The controller 320 detects the switching voltage VW, and then generates a first control voltage VC1 and a second control voltage VC2 according to the switching voltage VW. In some embodiments, the first control voltage VC is a clock with any frequency and any duty cycle.

The first current path 331 of the multi-order resonant circuit 330 includes a first transistor M1. For example, the first transistor M1 may be an NMOS transistor (N-type Metal Oxide Semiconductor Field Effect Transistor). The first transistor M1 has a control terminal for receiving the first control voltage VC1, a first terminal coupled to the ground voltage VSS, and a second terminal coupled to the first node N1.

The second current path 332 of the multi-order resonant circuit 330 includes a second capacitor C2 and a second transistor M2. For example, the second transistor M2 may be an NMOS transistor The second capacitor C2 has a first terminal coupled to the first node N1, and a second terminal coupled to a third node N3. The second transistor M2 has a control terminal for receiving the second control voltage VC2, a first terminal coupled to the ground voltage VSS, and a second terminal coupled to the third node N3.

The transformer 340 includes a main coil 341, an auxiliary coil 342, and a first inductor L1. The main coil 341 has a first terminal coupled to the second node N2 for receiving the switching voltage VW, and a second terminal coupled to the first node N1 for receiving the reference voltage VR. The auxiliary coil 342 has a first terminal coupled to a fourth node N4 for outputting a transformation voltage VT, and a second terminal coupled to the ground voltage VSS. The level of the transformation voltage VT may be proportional to a voltage difference VD between the switching voltage VW and the reference voltage VR. A magnetizing inductance of the transformation 340 may be modeled as the first inductor L1. The first inductor L1 has a first terminal coupled to the second node N2, and a second terminal coupled to the first node N1.

The output stage circuit 350 includes a diode D1 and a third capacitor C3. The diode D1 has an anode coupled to the fourth node N4, and a cathode coupled to the output node NOUT for outputting the output voltage VOUT. The third capacitor C3 has a first terminal coupled to the output node NOUT, and a second terminal coupled to the ground voltage VSS.

Figure 4:
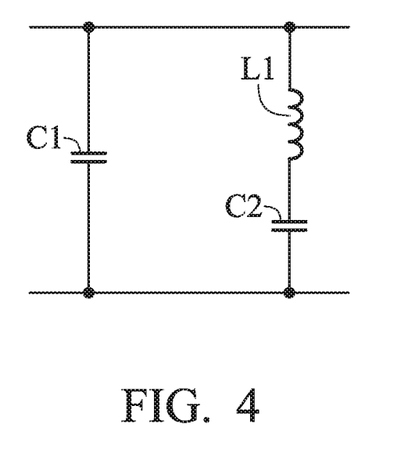
FIG. 4 is a diagram of an equivalent circuit of a second-order resonant loop according to an embodiment of the invention.

The operation principles of the power supply device 300 may be described as follows. Initially, the switching voltage VW is equal to the ground voltage VSS, and the second transistor M2 is disabled. Next, the power supply device 300 is coupled to the external power source for receiving the input voltage VIN, and thus the first capacitor C1 is charged up and the switching voltage VW gradually rises up. When it is detected that the switching voltage VW rises to a first threshold voltage VTH1, the controller 320 enables the second transistor M2 by pulling up the second control voltage VC2. Therefore, the first capacitor C1, the first inductor L1, and the second capacitor C2 resonate with each other, so as to form a second-order resonant loop. FIG. 4 is a diagram of an equivalent circuit of the second-order resonant loop according to an embodiment of the invention.

Figure 5:
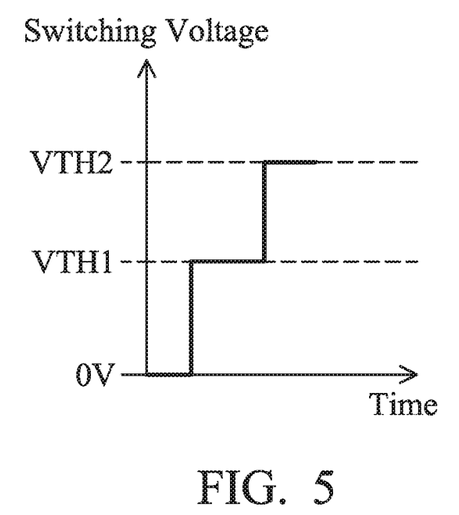
FIG. 5 is a diagram of voltage waveforms of a power supply device according to an embodiment of the invention.

FIG. 5 is a diagram of voltage waveforms of the power supply device 300 according to an embodiment of the invention. According to the measurement of FIG. 5, after the second-order resonant loop is applied, the switching voltage VW further rises to a second threshold voltage VTH2. The second threshold voltage VTH2 may be substantially two times the first threshold voltage VTH1. It should be noted that when a voltage dip or a short interruption happens to the external power source, the holding-up time of the power supply device 300 may be described as the equation (1).

$$\frac{1}{2} \cdot (C1) \cdot (VW)^2 = P \cdot T \tag{1}$$

where "C1" represents the capacitance of the first capacitor C1, "VW" represents the level of the switching voltage VW, "P" represents the output power of the power supply device 300, and "T" represents the holding-up time of the power supply device 300.

According to the equation (1), the holding-up time of the power supply device 300 is proportional to the square of the switching voltage VW. Thus, the holding-up time of the power supply device 300 is significantly increased by incorporating the second-order resonant loop for pulling up the switching voltage VW. If the frequency of the input voltage VIN is 50 Hz and the RMS value of the input voltage VIN is 100V, the operation characteristic of the conventional power supply device can be compared with that of the proposed power supply device 300 as the following Table I.

TABLE I

Comparison Between Conventional Power Supply Device and Proposed Power Supply Device 300

|  | Maximum Value of Input Voltage | Holding-up Time |
| --- | --- | --- |
| Conventional Power Supply Device | 141 V | 15.4 ms |
| Proposed Power Supply Device 300 | 282 V | 60 ms |

Device 300

In some embodiments, the element parameters of the power supply device 300 are described as follows. The capacitance of the first capacitor C1 may be from 90 μF to 110 μF, such as 100 μF. The capacitance of the second capacitor C2 may be from 297 μF to 363 μF, such as 330 μF. The capacitance of the third capacitor C3 may be from 612 μF to 748 μF, such as 680 μF. The inductance of the first inductor L1 may be from 450 mH to 550 mH, such as 500 mF. The turn ratio of the main coil 341 to the secondary coil 342 may be from 1 to 10, such as 5. The above ranges of parameters are calculated and obtained according to the results of many experiments, and they help to optimize the transformation efficiency and holding-up time of the power supply device 300.

Figure 6:
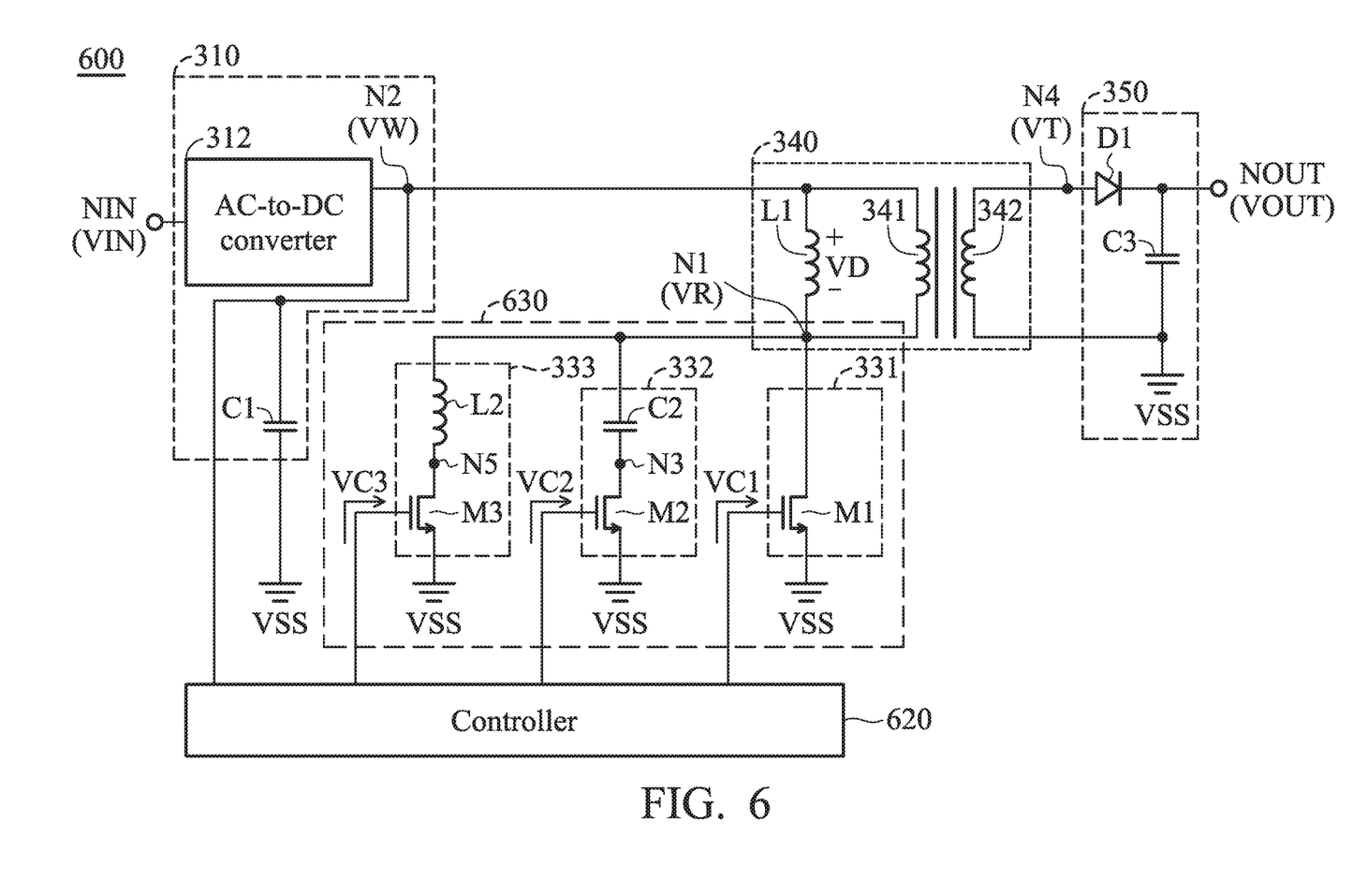
FIG. 6 is a diagram of a power supply device according to another embodiment of the invention.

FIG. 6 is a diagram of a power supply device 600 according to another embodiment of the invention. FIG. 6 is similar to FIG. 3. In the embodiment of FIG. 6, a controller of the power supply device 600 further generates a third control voltage VC3 according to the switching voltage VW, and a multi-order resonant circuit 630 of the power supply device 600 further includes a third current path 333. Specifically, the first node N1 of the multi-order resonant circuit 630 is further coupled through the third current path 333 to the ground voltage VSS, and the third current path 333 is selectively closed or open according to the third control voltage VC3.

The third current path 333 of the multi-order resonant circuit 630 includes a second inductor L2 and a third transistor M3. For example, the third transistor M3 may be an NMOS transistor. The second inductor L2 has a first terminal coupled to the first node N1, and a second terminal coupled to a fifth node N5. For example, the inductance of the second inductor L2 may be from 4.5 μH to 5.5 μH, such as 5 μF. The third transistor M3 has a control terminal for receiving the third control voltage VC3, a first terminal coupled to the ground voltage VSS, and a second terminal coupled to the fifth node N5.

Figure 7:
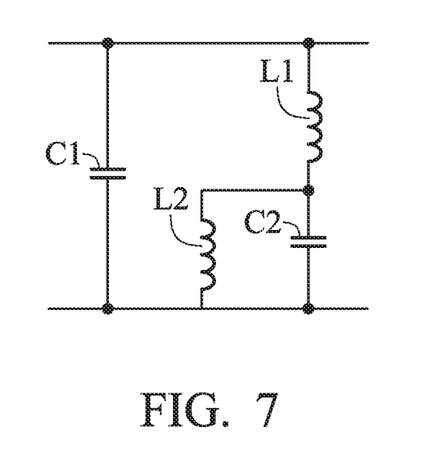
FIG. 7 is a diagram of an equivalent circuit of a third-order resonant loop according to another embodiment of the invention.

Similarly, the operation principles of the power supply device 600 may be described as follows. Initially, the third transistor M3 is disabled. When it is detected that the switching voltage VW rises to a second threshold voltage VTH2 which is higher than the first threshold voltage VTH1, the controller 620 enables the third transistor M3 by pulling up the third control voltage VC3. Therefore, the first capacitor C1, the first inductor L1, the second capacitor C2, and the second inductor L2 resonate with each other, so as to form a third-order resonant loop. FIG. 7 is a diagram of an equivalent circuit of the third-order resonant loop according to another embodiment of the invention.

Figure 8:
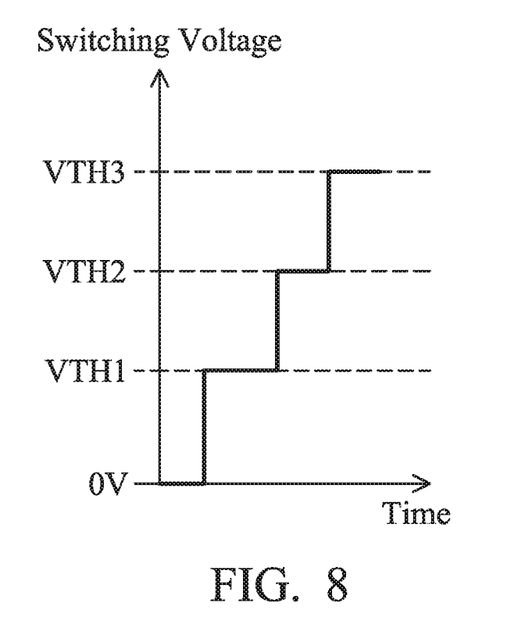
FIG. 8 is a diagram of voltage waveforms of a power supply device according to another embodiment of the invention.

FIG. 8 is a diagram of voltage waveforms of the power supply device 600 according to another embodiment of the invention. According to the measurement of FIG. 8, after the third-order resonant loop is applied, the switching voltage VW further rises to a third threshold voltage VTH3. The third threshold voltage VTH3 may be substantially √2 times the second threshold voltage VTH2. According to the equation (1), the holding-up time of the power supply device 600 is proportional to the square of the switching voltage VW. Thus, the holding-up time of the power supply device 600 is further increased by incorporating the third-order resonant loop for pulling up the switching voltage VW. If the frequency of the input voltage VIN is 50 Hz and the RMS value of the input voltage VIN is 100V, the operation characteristic of the conventional power supply device can be compared with that of the proposed power supply device 600 as the following Table II.

TABLE II

Comparison Between Conventional Power Supply Device and Proposed Power Supply Device 600

| | Maximum Value of Input Voltage | Holding-up Time |
|---|---|---|
| Conventional Power Supply Device | 141 V | 15.4 ms |
| Proposed Power Supply Device 600 | 400 V | 123 ms |

Supply Device 600

The invention proposes a novel power supply device which includes a multi-order resonant circuit for increasing storage energy of capacitors. According to practical measurements, the proposed power supply device using the aforementioned multi-order resonant circuit has a longer holding-up time and meets the requirements of IEC (International Electro Technical Commission). In addition, the design of pulling up voltages in several different stages can prevent circuit elements from being overloaded and damaged. Generally, the invention has higher output stability than the conventional design, and it is suitable for application in a variety of electronic devices.

Note that the above voltages, currents, resistances, inductances, capacitances and other element parameters are not limitations of the invention. A designer can adjust these parameters according to different requirements. The power supply device of the invention is not limited to the configurations of FIGS. 1-8. The invention may merely include any one or more features of any one or more embodiments of FIGS. 1-8. In other words, not all of the features displayed in the figures should be implemented in the power supply circuit of the invention. Although the embodiments of the invention use MOSFET as examples, the invention is not limited thereto, and those skilled in the art may use other types of transistors, such as BJT (Bipolar Junction Transistor), JFET (Junction Gate Field Effect Transistor), FinFET (Fin Field Effect Transistor), etc., without affecting the performance of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered exemplary only, with a true scope of the disclosed embodiments being indicated by the following claims and their equivalents.

What is claimed is:

1. A power supply device, comprising:
   an input stage circuit, generating a switching voltage according to an input voltage;

a controller, detecting the switching voltage, wherein the controller generates a first control voltage and a second control voltage according to the switching voltage;

a multi-order resonant circuit, providing a reference voltage at a first node, wherein the multi-order resonant circuit comprises a first current path and a second current path, the first node is respectively coupled through the first current path and the second current path to a ground voltage, the first current path is selectively closed or open according to the first control voltage, and the second current path is selectively closed or open according to the second control voltage;

a transformer, generating a transformation voltage according to a voltage difference between the switching voltage and the reference voltage; and an output stage circuit, generating an output voltage according to the transformation voltage.

2. The power supply device as claimed in claim 1, wherein the input stage circuit comprises:
an AC-to-DC converter, converting the input voltage at an input node into the switching voltage at a second node.

3. The power supply device as claimed in claim 2, wherein the input stage circuit further comprises:
a first capacitor, wherein the first capacitor has a first terminal coupled to the second node, and a second terminal coupled to the ground voltage.

4. The power supply device as claimed in claim 1, wherein the first current path of the multi-order resonant circuit comprises:
a first transistor, wherein the first transistor has a control terminal for receiving the first control voltage, a first terminal coupled to the ground voltage, and a second terminal coupled to the first node.

5. The power supply device as claimed in claim 1, wherein the second current path of the multi-order resonant circuit comprises:
a second capacitor, wherein the second capacitor has a first terminal coupled to the first node, and a second terminal coupled to a third node.

6. The power supply device as claimed in claim 5, wherein the second current path of the multi-order resonant circuit further comprises:
a second transistor, wherein the second transistor has a control terminal for receiving the second control voltage, a first terminal coupled to the ground voltage, and a second terminal coupled to the third node.

7. The power supply device as claimed in claim 6, wherein when the switching voltage rises to a first threshold voltage, the controller enables the second transistor.

8. The power supply device as claimed in claim 3, wherein the transformer comprises:

a main coil, wherein the main coil has a first terminal coupled to the second node for receiving the switching voltage, and a second terminal coupled to the first node for receiving the reference voltage.

9. The power supply device as claimed in claim 8, wherein the transformer further comprises:
an auxiliary coil, wherein the auxiliary coil has a first terminal coupled to a fourth node for outputting the transformation voltage, and a second terminal coupled to the ground voltage.

10. The power supply device as claimed in claim 9, wherein the transformer further comprises:
a first inductor, wherein the first inductor has a first terminal coupled to the second node, and a second terminal coupled to the first node.

11. The power supply device as claimed in claim 10, wherein the output stage circuit comprises:
a diode, wherein the diode has an anode coupled to the fourth node, and a cathode coupled to an output node for outputting the output voltage.

12. The power supply device as claimed in claim 11, wherein the output stage circuit further comprises:
a third capacitor, wherein the third capacitor has a first terminal coupled to the output node, and a second terminal coupled to the ground voltage.

13. The power supply device as claimed in claim 1, wherein the multi-order resonant circuit further comprises a third current path, the controller further generates a third control voltage according to the switching voltage, the first node is further coupled through the third current path to the ground voltage, and the third current path is selectively closed or open according to the third control voltage.

14. The power supply device as claimed in claim 13, wherein the third current path of the multi-order resonant circuit comprises:
a second inductor, wherein the second inductor has a first terminal coupled to the first node, and a second terminal coupled to a fifth node.

15. The power supply device as claimed in claim 14, wherein the third current path of the multi-order resonant circuit further comprises:
a third transistor, wherein the third transistor has a control terminal for receiving the third control voltage, a first terminal coupled to the ground voltage, and a second terminal coupled to the fifth node.

16. The power supply device as claimed in claim 15, wherein when the switching voltage rises to a second threshold voltage which is higher than the first threshold voltage, the controller enables the third transistor.

* * * * *